United States Patent
Gonidec et al.

[11] Patent Number: 5,987,881
[45] Date of Patent: Nov. 23, 1999

[54] THRUST REVERSER DOOR WITH SPRING BIASED MOVABLE EXTERNAL PANEL

[75] Inventors: Patrick Gonidec, Montivilliers; Pascal Gérard Rouyer, Saint Aubin Routot; Guy Bernard Vauchel, Le Havre, all of France

[73] Assignee: Societe Hispano-Suiza Aerostructures, Paris, France

[21] Appl. No.: 09/041,767

[22] Filed: Mar. 13, 1998

[30] Foreign Application Priority Data

Mar. 13, 1997 [FR] France .................................... 97.02982

[51] Int. Cl.⁶ ........................................................ F02K 1/70
[52] U.S. Cl. ........................ 60/226.2; 60/230; 244/110 B; 239/265.29
[58] Field of Search .................................. 60/226.2, 230; 244/110 B; 239/265.27, 265.29

[56] References Cited

U.S. PATENT DOCUMENTS

| | | | |
|---|---|---|---|
| 3,279,182 | 10/1966 | Helmintoller | 60/226 |
| 3,344,604 | 10/1967 | Mattia et al. | 60/229 |
| 3,605,411 | 9/1971 | Maison et al. | 60/226 |
| 4,005,836 | 2/1977 | Mutch | 244/110 B |
| 4,894,985 | 1/1990 | Dubois et al. | 60/226.2 |
| 5,230,213 | 7/1993 | Lawson | 60/226.2 |
| 5,297,387 | 3/1994 | Carimali et al. | 60/226.2 |

FOREIGN PATENT DOCUMENTS

| | | |
|---|---|---|
| 1 482 538 | 5/1967 | France . |
| 2 030 034 | 10/1970 | France . |
| 2 618 853 | 2/1989 | France . |
| 2 680 547 | 2/1993 | France . |

*Primary Examiner*—Ted Kim
*Attorney, Agent, or Firm*—Bacon & Thomas, PLLC

[57] ABSTRACT

A thrust reverser is disclosed for an aircraft jet engine having a cowling with an outer surface and at least one reverse thrust opening, the thrust reverser including a thrust reverser door assembly movable with respect to the cowling between a forward thrust position, in which the reverse thrust opening is uncovered, and a reverse thrust position in which the thrust reverser door uncovers the reverse thrust opening. The thrust reverser door assembly includes an inner structure, an external panel movably connected to the inner structure and one or more resilient devices acting on the inner structure and the external panel to bias the external panel toward the inner structure such that, when the thrust reverser door is in the forward thrust position the external panel is displaced away from the inner structure by contact with the cowling such that an outer surface of the external panel is substantially flush with the outer surface of the cowling.

14 Claims, 4 Drawing Sheets

THRUST REVERSER DOOR WITH SPRING BIASED MOVABLE EXTERNAL PANEL

BACKGROUND OF THE INVENTION

The present invention relates to a thrust reverser door with a movable external panel to prevent misalignment between the thrust reverser door and the cowling opening during engine operation.

Turbofan-type turbojet engines are well known in the art and typically comprise a fan at the front of the turbojet engine which directs a flow of bypass air through a duct bounded by the engine cowling on the inside and a fan cowling on the outside. The generally annular duct bounded by the engine cowling and the fan cowling may channel both the bypass flow and the primary exhaust gas flow downstream from the turbojet engine, or may channel only the bypass flow.

In aircraft on which the turbojet engine is mounted outside of the airframe structure, the fan cowling and the engine cowling are configured to form boundaries of the bypass flow duct and to provide aerodynamic outer surfaces to reduce drag.

FIGS. 1 and 2 illustrate a known pivoting door-type thrust reverser associated with the cowling of a turbofan-type turbojet engine. As illustrated in FIG. 1, the upstream portion of the cowling which defines the outer limits of the bypass flow duct and which is generally concentrically arranged about the turbojet engine (not shown) is designated as 1 and generally comprises an external cowling panel and an internal cowling panel interconnected by a frame 6. The outer surface of the external cowling panel has an aerodynamic surface over which the air external to the engine passes during aircraft flight. The inner surface of the inner cowling panel defines the outer boundary of the bypass flow duct 15 through which the bypass flow air passes from left to right as viewed in FIG. 1.

The cowling also comprises a thrust reverser, illustrated generally at 2, and a downstream cowling portion 3. The thrust reverser 2 comprises a door 7 pivotally attached to the cowling so as to pivot about transverse axis 17 such that it is movable between a closed, forward thrust position, illustrated in FIG. 1, and an open, reverse thrust position in which the forward end (towards the left as viewed in FIG. 1) of the thrust reverser door 7 is moved outwardly from the cowling, while a rear portion is moved inwardly into the bypass flow duct airstream so as to redirect at least a portion of the bypass flow through an opening in the cowling in a direction that has a reverse thrust component.

An actuator 8 for moving the door 7 between its forward thrust and reverse thrust positions may comprise a cylinder extending through and mounted to the frame 6, and having an extendable and retractable piston rod connected to the thrust reverser door 7.

The thrust reverser door 7 has an outer door panel 9 and an inner door panel 11 joined together by an internal structure. The forward end of the door 7 may have a deflector 13 to maximize the efficiency of the thrust reverser when the door 7 is in the reverse thrust position. When the door is in the forward thrust position, as illustrated in FIG. 1, the outer door panel 9 is substantially flush with the external surfaces of the upstream panel and the downstream cowling portion 3. The inner face 11 tapers toward the outer surface 9 at the forward end of the door 7, forming a cavity 16 when in the forward thrust position.

As illustrated in FIG. 2, a plurality of thrust reverser doors 7 may be incorporated into the cowling, such doors being circumferentially spaced around the periphery of the cowling. Longitudinal beam portions 18 extend axially between forward part 4 and rear part 3 of the cowling between adjacent thrust reverser doors 7 to provide structural rigidity to the cowling and to provide pivot mounting points for attaching the doors 7 to the cowling. U.S. Pat. No. 3,605,411, and French Patents 1,482,538 and 2,030,034 illustrate typical, known thrust reversers.

It is known to utilize one linear actuator per thrust reverser door affixed to the cowling and the thrust reverser door to move the door between the forward and reverse thrust positions, as illustrated in the aforementioned French Patent 1,482,538.

The thrust reverser disclosed in U.S. Pat. No. 3,605,411 has a forward deflector which enables the inner surface of the thrust reverser door to provide continuity to the outer boundary of the airflow duct when the thrust reverser is in the forward thrust position. As is also disclosed in French Patent 2,618,853, the deflector is masked to optimize engine performance when the thrust reverser is in the forward thrust mode.

As disclosed in French Patent 2,680,547, the deflectors may be configured to orient the flow of the reverse thrust gases, such control being also in conjunction with the shape of deflection edges on the opening through the cowling through which the reverse thrust gases flow.

In all of the above mentioned thrust reversers, the thrust reverser doors comprise an integral structure with the portion forming the external surface of the thrust reverser door (when in the forward thrust position) integrally joined to an inner structure. Seals are typically located at the juncture of these two structures. While generally satisfactory, such integral thrust reverser doors may create problems during aircraft flight since the pressure within the gas flow duct 15 is higher than the ambient air pressure surrounding the cowling. As a result of this pressure differential, the thrust reverser door is stressed and may undergo geometric deformations. Such deformations may cause gaps between the exterior surface of the integral thrust reverser door and the cowling edges defining the reverse thrust opening that seriously degrade aerodynamic performance of the cowling.

SUMMARY OF THE INVENTION

A thrust reverser is disclosed for an aircraft jet engine having a cowling with an outer surface and at least one reverse thrust opening, the thrust reverser including a thrust reverser door assembly movable with respect to the cowling between a forward thrust position, in which the thrust reverser door assembly covers the reverse thrust opening, and a reverse thrust position in which the reverse thrust opening is uncovered. The thrust reverser door assembly includes an inner structure, an external panel movably connected to the inner structure and one or more resilient devices acting on the inner structure and the external panel to bias the external panel toward the inner structure such that, when the thrust reverser door is in the forward thrust position the external panel is displaced away from the inner structure by contact with the cowling such that an outer surface of the external panel is substantially flush with the outer surface of the cowling.

A seal is interposed solely between the inner structure and the surrounding cowling such that pressure differential forces act only on the inner structure which is allowed to deflect and deform relative to the external panel without causing the external panel to be displaced from the cowling, thereby avoiding the formation of gaps between the external panel and the cowling. Since the external surface of the external panel is substantially flush with the external surface of the cowling, such stresses acting on the inner door structure do not degrade the aerodynamic performance of the cowling.

The resilient device connecting the separate and distinct external panel and inner structure may be a compression or tension coil spring, a leaf spring, or other known resilient devices.

DETAILED DESCRIPTION OF THE PREFERRED EMBODIMENTS

Figure 1:
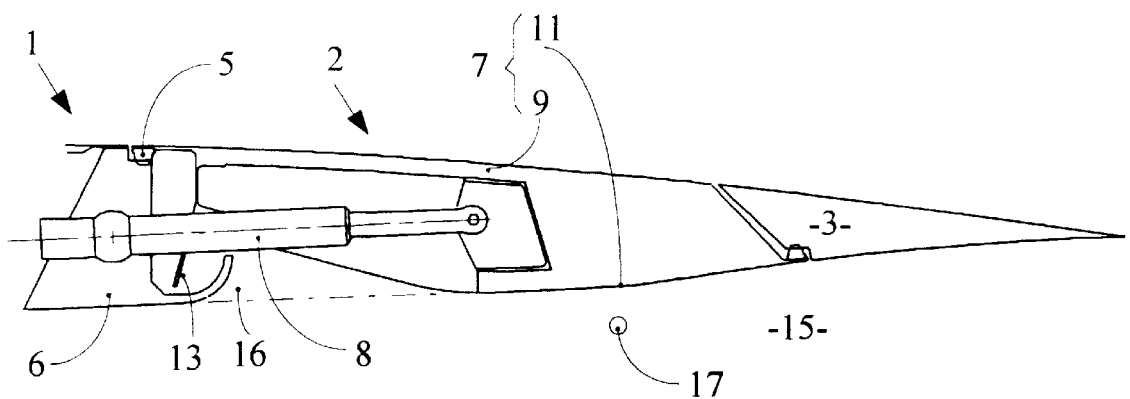
FIG. 1 is a partial, longitudinal cross-sectional view illustrating a known type of thrust reverser with the thrust reverser door in the forward thrust position.
Figure 2:
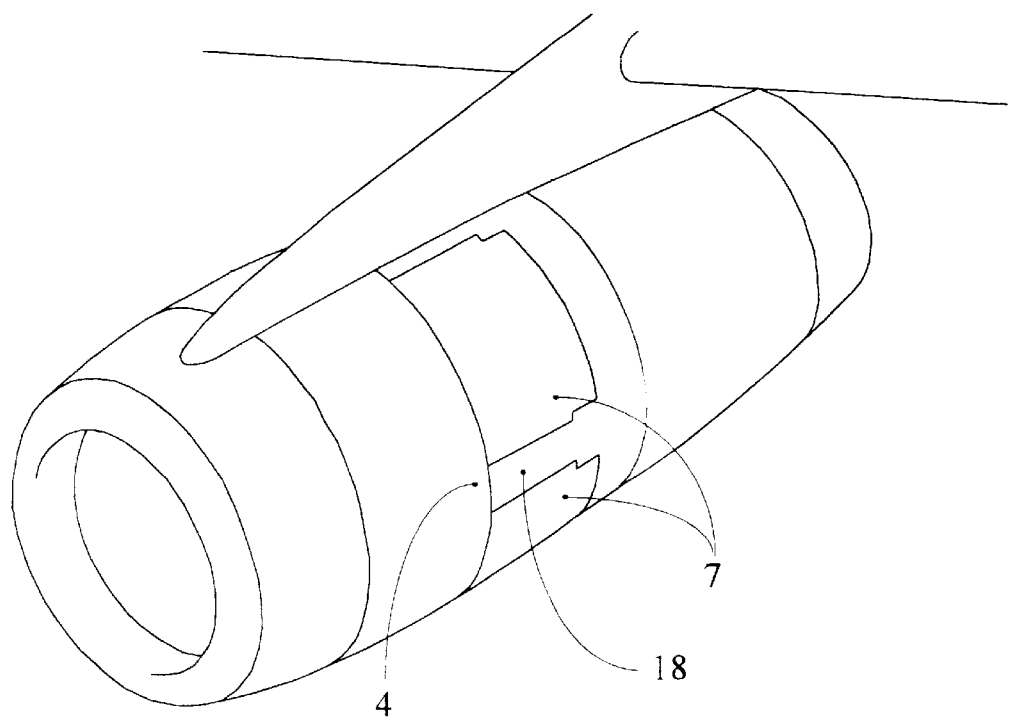
FIG. 2 is a perspective view of an engine cowling incorporating the thrust reverser of FIG. 1.
Figure 3:
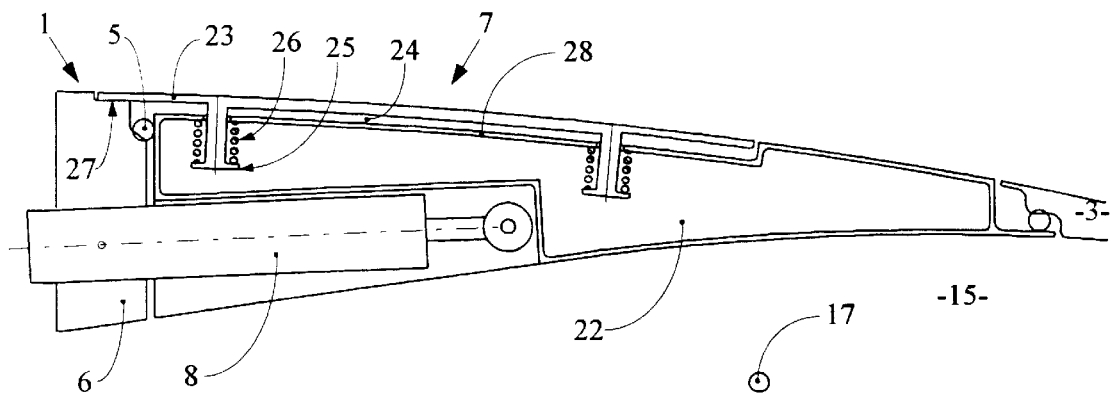
FIG. 3 is a partial, longitudinal, cross-sectional view of a first embodiment of the thrust reverser according to the present invention with the thrust reverser door in the forward thrust position.
Figure 4:
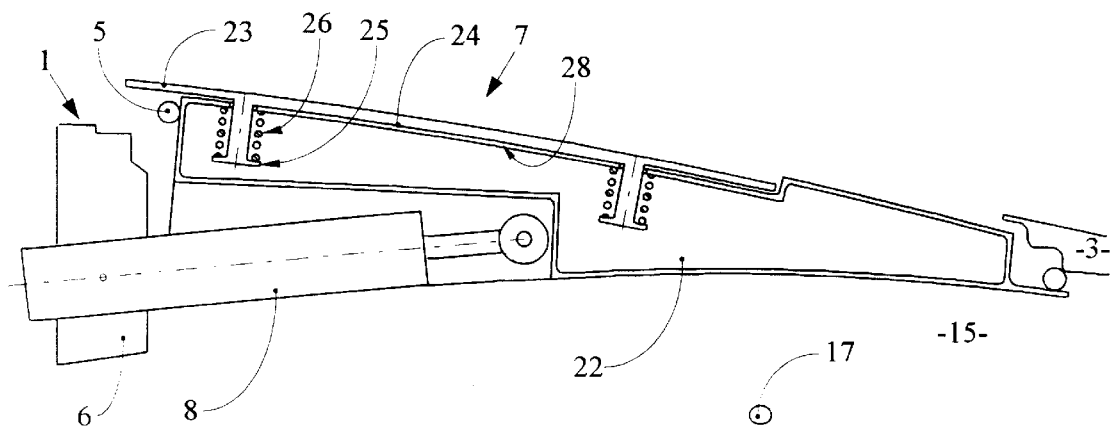
FIG. 4 is a view similar to FIG. 3, illustrating the displacement of the thrust reverser door toward the reverse thrust position.

FIGS. 3 and 4 illustrate a first embodiment of the thrust reverser door according to the present invention. The thrust reverser door 7 comprises inner structure 22, external panel 23 and resilient devices 26. Although a plurality of resilient devices are illustrated, it is to be understood that, depending upon the particular design characteristics of each application, a single resilient device may be utilized without exceeding the scope of this invention. The resilient device interposed between the external panel 23 and the inner structure 22 isolates the external panel 23 from the stresses exerted on the inner structure 22 by the pressure differential of the gases within duct 15 and the ambient atmospheric pressure. A seal 5 is attached solely to the inner structure 22 and bears against an adjacent portions of the cowling when the thrust reverser door 7 is in the forward thrust portion, as illustrated in FIG. 3.

In this embodiment, the resilient devices each comprise a compression coil spring 26 through which extends a guide stem 25 extending from an inner surface of the external panel 23. Each guide stem has an enlarged headed portion against which one end of the compression coil spring 26 bears, with the opposite end of the compression coil spring bearing against a portion of the inner structure 22. Resilient coil springs 26 bias the external panel 23 toward the inner structure 22. However, contact between a portion of the external panel 23 and a contact surface 27 formed on the cowling displaces the external panel 23 from the inner structure 22 when the thrust reverser door 7 is in the forward thrust position to create space 24. In this position, an external surface of the external panel 23 is substantially aligned and flush (i.e. faired) with the external surface of the cowling 1 so as to form a faired aerodynamic outer surface therewith. Since the external panel 23 is displaced from the inner structure 22, deformation of the inner structure 22 caused by the pressure differential between ambient atmosphere and the gas pressure within duct 15 will not cause displacement of the external panel 23 from its flush (i.e. faired) aerodynamic relationship with the external surface of the cowling 1. Since seal 5 is interposed between the inner structure 22 and the cowling 1, the pressure within the gas flow duct 15 does not act on the external panel 23.

When the thrust reverser door is displaced toward the reverse thrust position, as illustrated in FIG. 4, the space 24 between the external panel 23 and the inner structure 22 is reduced, or eliminated, by the expansion of compression springs 26. Although springs are specifically disclosed in this embodiment, and in the remaining illustrated embodiments, it is to be understood that a vulcanized elastomer may be applied between the relatively moveable external panel 23 and the inner structure 22 to provide the same biasing forces as the disclosed springs.

The external panel 23 may cover all of the outer surface of the thrust reverser door 7, or may form only a portion of the outer surface of the thrust reverser door 7. Also, the external panel 23 may be formed as an integral, one-piece element, or may be formed from several parts. The forward edge portion (towards the left as viewed in FIGS. 3 and 4) engages contact surface 27 formed on the cowling 1, in this particular instance the front frame 6. The contact surface may extend only adjacent to the portion of the cowling forming the front edge of the thrust reverse opening, may extend along opposite sides of the reverse thrust opening, or a combination of both.

The external panel 23 may be fabricated from any type of material known to be suitable for aeronautical usage, such as, but not limited to, aluminum, titanium, thermoplastic, or composite material.

Contact surface 27 may extend continuously along the portions of the cowling forming front and sides of the reverse thrust opening, or may comprise a plurality of individual contact spots.

Figure 5:
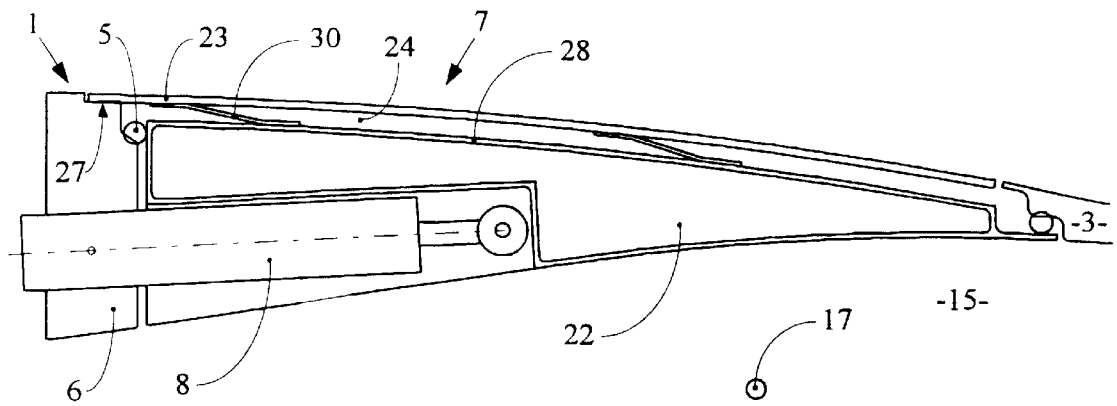
FIG. 5 is a view similar to FIG. 3 illustrating a second embodiment of the thrust reverser door according to the present invention.
Figure 6:
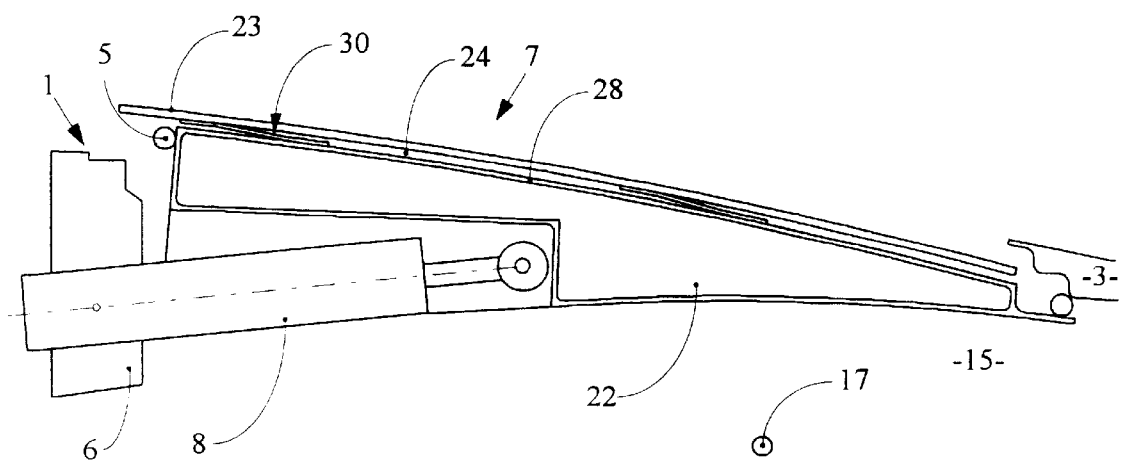
FIG. 6 is a similar to FIG. 4, illustrating the displacement of the thrust reverser door of FIG. 5 toward the reverse thrust position.

A second embodiment of the present invention is illustrated in FIGS. 5 and 6. The structures and functions of the elements in this embodiment are identical with those of the previously described embodiment, except that leaf springs 30 are substituted for the compression coil springs 26. As can be seen, leaf springs 30 may be directly interposed between a lower surface of the external panel 23 and an outer surface 28 of the inner structure 22. Leaf springs 30 will bias the external panel 23 toward the inner structure 22 as in the previously described embodiment. Again, contact of the external panel 23 with the contact surface 27 will cause displacement of the external panel 23 away from the inner structure 22 creating space 24 therebetween. External panel 23 is isolated from the pressures within the gas flow duct 15 by seals 5, as in the previously described embodiment. The present invention also encompasses the use of a single leaf spring.

Figure 7:
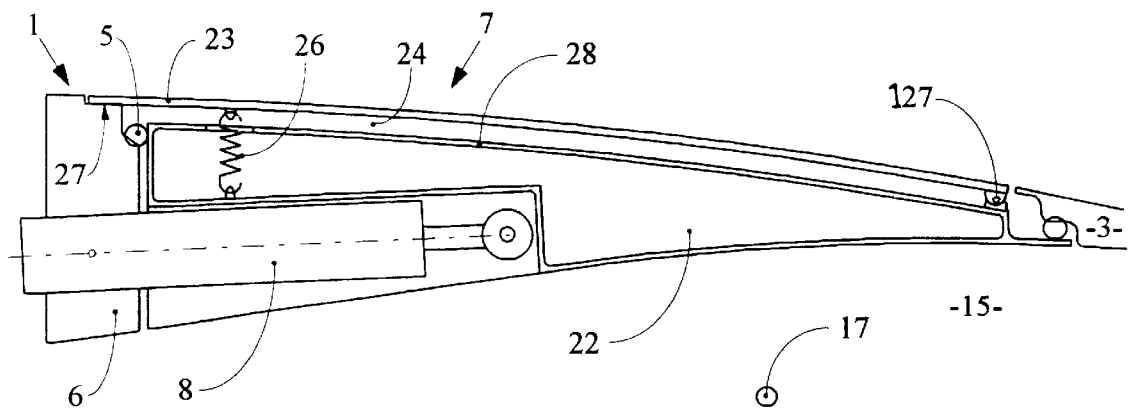
FIG. 7 is a view similar to FIG. 3, illustrating an alternative embodiment of the thrust reverser door according to the present invention.

In the embodiment illustrated in FIG. 7, the external panel 23 is pivotally attached to the inner structure 22 at pivot 127, located, in this particular instance at rear portions of these elements. The pivot 127 may be centrally located across the transverse dimension of external panel 23 and the inner structure 22, or a plurality of pivots 127 may be utilized spaced across these respective elements. The resilient device comprises a tension spring 26 connected between the external panel 23 and the inner structure 22 which biases the forward portion of the external panel 23 toward the inner structure 22. In this embodiment, as in the previously described embodiments, as the external panel 23 contacts the contact surface 27, it will be displaced away from the inner structure 22 as the door 7 reaches its forward thrust position, to create space 24 therebetween. Although a single tension spring 26 is illustrated, it is to be understood that a plurality of such springs may be utilized without exceeding the scope of this invention.

Figure 8:
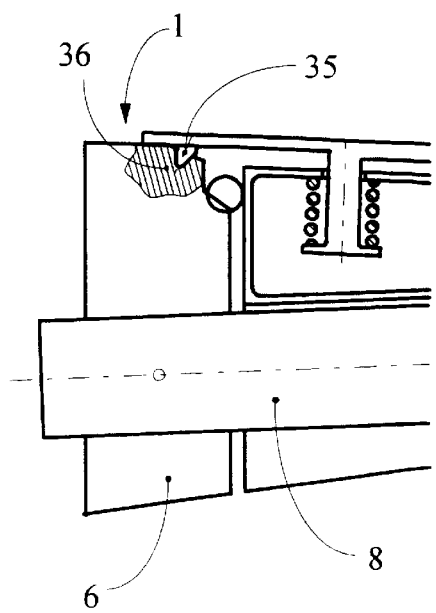
FIG. 8 is a partial, cross-sectional view illustrating a positioning device for the thrust reverser door.

FIG. 8 illustrates a positioning device that may be utilized with any of the previously described embodiments. To accurately position the external panel 23 relative to the cowling 1, a positioning protrusion 35 may extend from an inner surface of the external panel which engages a corresponding positioning hole formed in contact portion 36 of front frame 6. The engagement of the positioning protrusion with the positioning hole permits accurate placement of the external panel 23 relative to the cowling 1 and prevents any spurious displacement of the panel.

The foregoing descriptions are provided for illustrative purposes only and should be construed as in any way limiting this invention, the scope of which is defined solely by the appended claims.

We claim:

1. A thrust reverser for an aircraft jet engine having a cowling with an outer surface, the cowling having at least one reverse thrust opening, the thrust reverser including at least one thrust reverser door assembly movable with respect to the cowling between a forward thrust position in which the at least one thrust reverser door assembly covers the at least one reverse thrust opening, and a reverse thrust position in which the at least one thrust reverser door is displaced from and uncovers the at least one reverse thrust opening, the at least one thrust reverser door comprising:
   a) an inner structure;
   b) an external panel movably connected to the inner structure;
   c) a contact surface on the cowling located adjacent to an edge of the reverse thrust opening such that a portion of the external panel contacts the contact surface when the thrust reverser door is in the forward thrust positions; and,
   d) at least one resilient device acting on the inner structure and the external panel to bias the external panel toward the inner structure such that, in the forward thrust position, the external panel is moved away from the inner structure such that an outer surface of the external panel is substantially aligned and flush with the outer surface of the cowling so as to form a faired aerodynamic outer surface therewith.

2. The thrust reverser of claim 1 further comprising a seal interposed between the cowling and the inner structure when the thrust reverser door is in the forward thrust position.

3. The thrust reverser of claim 2 wherein the seal is affixed solely to the inner structure.

4. The thrust reverser of claim 1 wherein the at least one resilient device comprises at least one spring.

5. The thrust reverser of claim 4 wherein the at least one spring comprises a compression spring.

6. The thrust reverser of claim 4 wherein the at least one spring comprises a tension spring.

7. The thrust reverser of claim 6 wherein the tension spring comprises a coil spring.

8. The thrust reverser of claim 4 wherein the at least one spring comprises a leaf spring.

9. The thrust reverser of claim 1 wherein the at least one resilient device comprises a plurality of resilient devices.

10. The thrust reverser of claim 1 wherein a rear portion of the inner structure is pivotally connected to the external panel.

11. The thrust reverser of claim 10 wherein the at least one resilient device is located at a forward portion of the thrust reverser door assembly.

12. The thrust reverser of claim 1 further comprising:
   a) a positioning hole in the cowling; and,
   b) a positioning protrusion extending from the external panel so as to engage the positioning hole when the thrust reverser door assembly is in the forward thrust position.

13. The thrust reverser of claim 12 wherein the positioning hole is located adjacent to a forward side of the reverse thrust opening.

14. A thrust reverser for an aircraft jet engine having a cowling with an outer surface, the cowling having at least one reverse thrust opening, the thrust reverser including at least one thrust reverser door assembly movable with respect to the cowling between a forward thrust position in which the at least one thrust reverser door assembly covers the at least one reverse thrust opening, and a reverse thrust position in which the at least one thrust reverser door is displaced from and uncovers the at least one reverse thrust opening, the at least one thrust reverser door comprising:
   a) an inner structure;
   b) an external panel movably connected to the inner structure;
   c) a contact surface on the cowling located adjacent to an edge of the reverse thrust opening such that a portion of the external panel contacts the contact surface when the thrust reverser door is in the forward thrust position;
   d) at least one compression coil spring; and,
   e) at least one guide stem extending from the external panel through the coil spring such that the compression coil spring acts on the at least one guide stem and the inner structure to bias the external panel toward the inner structure such that, in the forward thrust position, the external panel is moved away from the inner structure such that an outer surface of the external panel is substantially flush with the outer surface of the cowling.

* * * * *